(12) United States Patent
Lambrechts et al.

(10) Patent No.: US 8,962,150 B2
(45) Date of Patent: **\*Feb. 24, 2015**

(54) STEEL FIBRE FOR REINFORCING CONCRETE OR MORTAR HAVING AN ANCHORAGE END WITH AT LEAST TWO BENT SECTIONS

(75) Inventors: Ann Lambrechts, Avelgem (BE); Frederik Vervaecke, Ghent (BE)

(73) Assignee: NV Bekaert SA, Zwevegem (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/993,894

(22) PCT Filed: Dec. 14, 2011

(86) PCT No.: PCT/EP2011/072747
§ 371 (c)(1),
(2), (4) Date: Jun. 13, 2013

(87) PCT Pub. No.: WO2012/080326
PCT Pub. Date: Jun. 21, 2012

(65) Prior Publication Data
US 2013/0269572 A1    Oct. 17, 2013

(30) Foreign Application Priority Data

Dec. 15, 2010 (EP) .................................... 10195107

(51) Int. Cl.
*C04B 14/48* (2006.01)
*E04C 5/01* (2006.01)

(52) U.S. Cl.
CPC ............... *C04B 14/48* (2013.01); *E04C 5/012* (2013.01)
USPC .......................... 428/606; 428/603; 106/644

(58) Field of Classification Search
None
See application file for complete search history.

(56) References Cited

U.S. PATENT DOCUMENTS

| 2,677,955 | A | * | 5/1954 | Constantinesco | ............. 428/221 |
| 3,852,930 | A | | 12/1974 | Naaman | |
| 3,900,667 | A | * | 8/1975 | Moens | ....................... 428/294.4 |
| 3,942,955 | A | | 3/1976 | Moens | |
| 3,953,953 | A | | 5/1976 | Marsden | |
| 4,159,911 | A | | 7/1979 | Takazuka | |

(Continued)

FOREIGN PATENT DOCUMENTS

| DE | G 92 07 598.3 U1 | 10/1992 |
| DE | 9302557 U1 | 4/1993 |

(Continued)

OTHER PUBLICATIONS

International Search Report in PCT/EP2011/072747, Sep. 11, 2012.

(Continued)

*Primary Examiner* — John J Zimmerman
(74) *Attorney, Agent, or Firm* — Bacon & Thomas, PLLC

(57) ABSTRACT

A steel fiber for reinforcing concrete or mortar comprises a middle portion and an anchorage end at one or both ends of the middle portion. The middle portion has a main axis. The anchorage end is deflecting from the main axis of the middle portion in a deflection section. The anchorage end has n bent sections, with n equal or larger than 2. The steel fiber is configured so that when the steel fiber is in a stable position on a horizontal surface being vertically projected on this horizontal surface, the vertical projections in this horizontal surface of all of the n bent sections of an anchorage end are located at one side of the vertical projection in this horizontal surface of the main axis of the middle portion.

12 Claims, 10 Drawing Sheets

(56) References Cited

U.S. PATENT DOCUMENTS

| | | | |
|---|---|---|---|
| 4,224,377 A * | 9/1980 | Moens | 428/369 |
| 4,233,364 A | 11/1980 | van Thiel | |
| 4,284,667 A | 8/1981 | Moens | |
| 4,298,660 A | 11/1981 | Nakagawa | |
| 4,513,040 A | 4/1985 | Lankard | |
| 4,559,276 A | 12/1985 | Tezuka | |
| 4,560,622 A | 12/1985 | Tezuka et al. | |
| 4,585,487 A | 4/1986 | Destree et al. | |
| 4,764,488 A | 8/1988 | Saito et al. | |
| 4,804,585 A | 2/1989 | Tani et al. | |
| 4,883,713 A | 11/1989 | Destree et al. | |
| 4,960,649 A | 10/1990 | Takata et al. | |
| 5,215,830 A * | 6/1993 | Cinti | 428/606 |
| 5,359,873 A * | 11/1994 | Grondziel | 72/186 |
| 5,443,918 A * | 8/1995 | Banthia et al. | 428/603 |
| 5,503,670 A | 4/1996 | Richard et al. | |
| 5,858,082 A | 1/1999 | Cruz et al. | |
| 5,965,277 A | 10/1999 | Banthia et al. | |
| 6,045,910 A * | 4/2000 | Lambrechts | 428/399 |
| 6,235,108 B1 * | 5/2001 | Lambrechts | 106/644 |
| 6,887,309 B2 | 5/2005 | Casanova et al. | |
| 2002/0177003 A1 | 11/2002 | Myrick | |
| 2007/0261354 A1 | 11/2007 | Chang | |
| 2011/0212343 A1 | 9/2011 | Stahl | |
| 2012/0090507 A1 * | 4/2012 | Lambrechts | 106/644 |
| 2012/0097073 A1 * | 4/2012 | Lambrechts | 106/644 |
| 2013/0255540 A1 * | 10/2013 | Lambrechts et al. | 106/644 |
| 2013/0269572 A1 * | 10/2013 | Lambrechts et al. | 106/638 |

FOREIGN PATENT DOCUMENTS

| | | |
|---|---|---|
| DE | 4315270 A1 | 11/1993 |
| DE | 42 23 804 A1 | 1/1994 |
| DE | 4242150 A1 | 6/1994 |
| DE | 9202767 U1 | 6/1996 |
| DE | 10 2008 034 250 A1 | 1/2010 |
| EP | 0 582 905 A2 | 2/1994 |
| EP | 0 851 957 B1 | 5/2000 |
| EP | 1 282 751 B1 | 2/2003 |
| EP | 1 383 634 B1 | 1/2004 |
| EP | 1 790 792 A2 | 5/2007 |
| EP | 1 840 291 A2 | 10/2007 |
| JP | 6-294017 A | 10/1994 |
| WO | 84/02732 A1 | 7/1984 |
| WO | 9323343 A1 | 11/1993 |
| WO | 9955980 A1 | 11/1999 |
| WO | 2010078995 A1 | 7/2010 |

OTHER PUBLICATIONS

Verband Deutscher Stahlfaserhersteller E. V., Stahlfaserbeton—Stahlfasertypen, Jun. 23, 2006, pp. 1-4.

Ravindra K. Dhir, Composite Materials in Concrete Constructions, 2002, 4 pages.

* cited by examiner

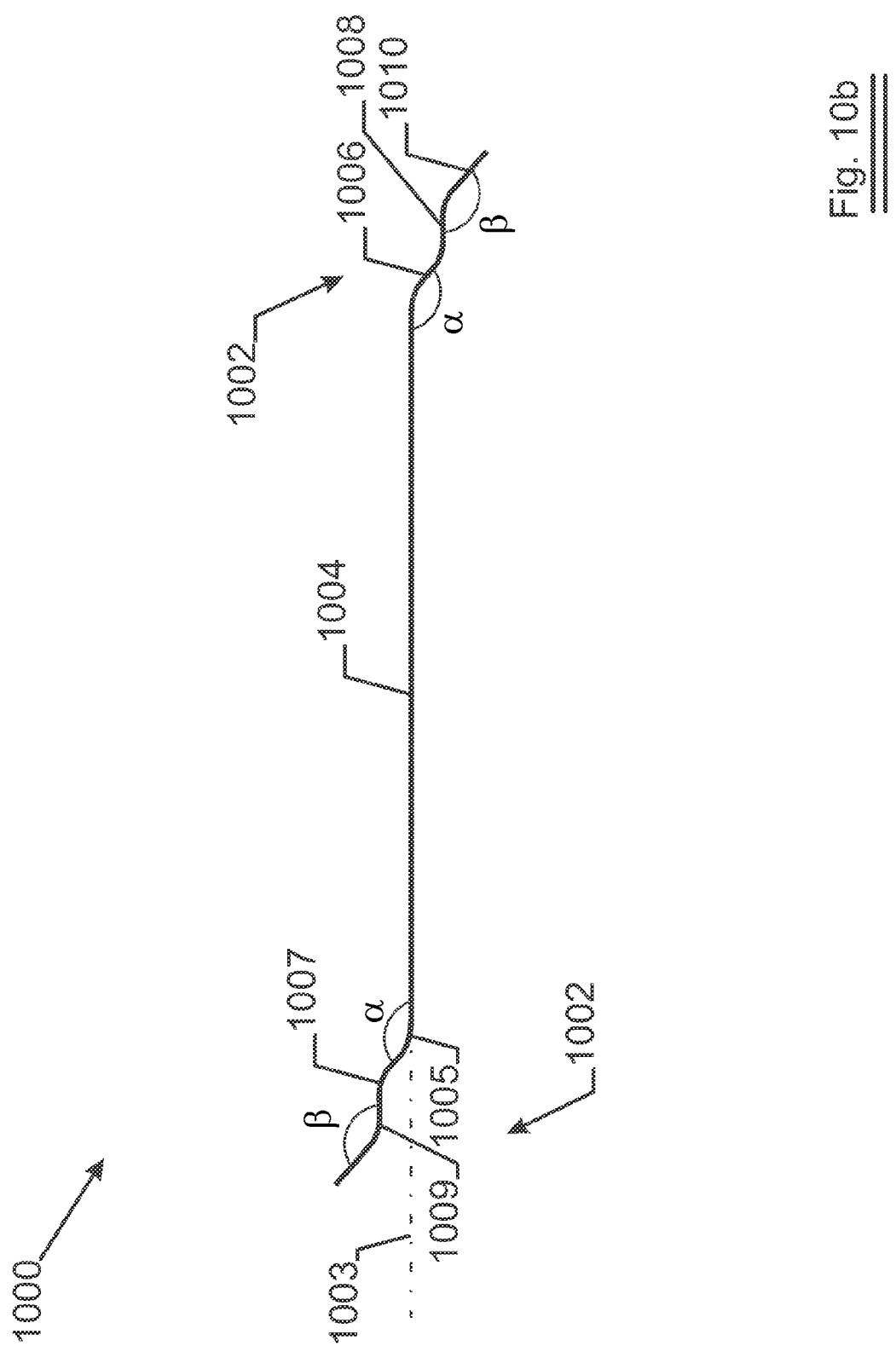

STEEL FIBRE FOR REINFORCING CONCRETE OR MORTAR HAVING AN ANCHORAGE END WITH AT LEAST TWO BENT SECTIONS

TECHNICAL FIELD

The invention relates to steel fibres for reinforcing concrete or mortar provided with anchorage ends allowing to obtain a good anchorage when embedded in concrete or mortar. The steel fibres have anchorage ends having at least two bent sections. The steel fibres according to the present invention show a good performance at service-ability limit state (SLS) and at ultimate limit state (ULS) when embedded in concrete or mortar.

The invention further relates to concrete or mortar structures comprising such steel fibres.

BACKGROUND ART

Concrete is a brittle material having low tensile strength and low strain capacity. To improve properties of concrete like tensile strength and strain capacity, fibre reinforced concrete and more particularly metallic fibre reinforced concrete has been developed.

It is known in the art that the properties of the fibres like fibre concentration, fibre geometry and fibre aspect ratio greatly influences the performance of the reinforced concrete.

With respect to fibre geometry it is known that fibres having a shape different from a straight shape provide better anchorage of the fibre in the concrete or mortar.

It is furthermore known that fibres not showing the tendency to form balls when added to or mixed with concrete or mortar are preferred.

Numerous examples of different fibre geometries are known in the art. There are for example fibres that are provided with undulations, either over the whole length or over part of their length. Examples of steel fibres undulated over their whole length are described in WO84/02732. Also fibres having hook-shaped ends are known in the art. Such fibres are for example described in U.S. Pat. No. 3,942,955.

Similarly, there are fibres of which the cross-section profile changes over the length, such as fibres provided with thickened and/or with flattened sections.

An example of a steel fibre provided with thickened sections is a steel fibre with thickenings in the form of a nail head at each of the extremities as described in U.S. Pat. No. 4,883,713.

Japanese patent 6-294017 describes the flattening of a steel fibre over its entire length. German Utility Model G9207598 describes the flattening of only the middle portion of a steel fibre with hook-shaped ends. U.S. Pat. No. 4,233,364 describes straight steel fibres provided with ends that are flattened and are provided with a flange in a plane essentially perpendicular to the flattened ends.

Steel fibres with flattened hook shaped ends are known from EP 851957 and EP 1282751.

Currently known prior art fibres for concrete reinforcement function very well in the known application fields like industrial flooring, sprayed concrete, pavement, . . . .

However, the disadvantage of currently known prior art fibres is the relatively low performance at ultimate limit state (ULS) when low or moderate dosages of fibres are used. For more demanding structural applications, like beams and elevated slabs high dosages, typically from 0.5 vol % (40 kg/m$^3$) onwards and not exceptionally up to 1.5 vol % (120 kg/m$^3$) are used to provide the necessary performance at ULS. These high dosages do not facilitate the mixing and placing of the steel fibre reinforced concrete.

Some prior art fibres do not perform at ULS as they break at crack mouth opening displacements (CMODs) lower than what is required for ULS. Other fibres, like fibres with hook shaped ends do not perform well at ULS as they are designed to be pulled out.

DISCLOSURE OF INVENTION

It is an object of the present invention to provide steel fibres for the reinforcement of concrete or mortar avoiding the drawbacks of the prior art.

It is another object to provide steel fibres which are capable of bridging the crack mouth opening displacements greater than 0.5 mm, 1 mm, 1.5 mm, 2 mm, 2.5 mm or even greater than 3 mm during the three point bending test according to the European Standard EN 14651 (June 2005).

It is a further object of the present invention to provide steel fibres showing good anchorage in concrete or mortar.

It is a further object to provide steel fibres not showing the tendency to form balls when mixed in the concrete or mortar.

Furthermore it is an object of the present invention to provide steel fibres which may advantageously be used for structural applications whereby the steel fibres are used in low or moderate dosages, typically 1 vol % of steel fibres or 0.5 vol % of steel fibres.

Additionally it is another object to provide steel fibres that allow to reduce or to avoid the creep behaviour of cracked concrete reinforced with those fibres in the tension zone.

According to a first aspect of the present invention, there is provided a steel fibre for reinforcing concrete or mortar.

The steel fibre comprises a straight middle portion and an anchorage end at one or both ends of the middle portion.

The middle portion has a main axis. The anchorage end is deflecting from the main axis of the middle portion in a deflection section.

The anchorage end is connected to the middle portion by the deflection section.

The anchorage end has n bent sections, with n equal or larger than 2. When the steel fibre according to the present invention being in a stable position on a horizontal surface is vertically projected on this horizontal surface, the vertical projections in this horizontal surface of all of the n bent sections of an anchorage end are located at one side of the vertical projection in this horizontal surface of the main axis of the middle portion.

The deflection section is having a radius of curvature. Furthermore, each of the bent sections is having a radius of curvature: the first bent section has a first radius of curvature; the second bent section has a second radius of curvature, the third bent section (if present) has a third radius of curvature, the n$^{th}$ bent section (if present) has a n$^{th}$ radius of curvature.

As specified above an anchorage end of a steel fibre according to the present invention has at least n bent sections, with n being equal or larger than 2. In particular embodiments an anchorage end of a steel fibre according to the present invention may comprise more than two bent sections. In principle there is no limitation to the number of bent sections of an anchorage end of a steel fibre according to the present invention. However, the most preferred embodiments have two bent sections, three bent sections or four bent sections.

As the deflection section can also be considered as a bent section, the steel fibre according to the present invention has for each anchorage end n+1 bent sections: one deflection section and n bent sections. A steel fibre having two anchorage ends has 2x(n+1) bent sections.

The deflection section is connecting the anchorage end to the middle portion of the steel fibre and is making that the anchorage end is deflecting from the main axis of the middle portion of the steel fibre. With "deflecting'" is meant turning aside from a straight line, i.e. turning aside from the main axis of the middle portion of the steel fibre.

When a steel fibre according to the present invention being in a stable position on a horizontal surface is vertically projected on this horizontal surface, the vertical projections in this horizontal surface of all of the n bent sections of an anchorage end are located at one side of the vertical projection in this horizontal surface of the main axis of the main axis of the middle portion, i.e. all of the n bent section of an anchorage end are located at one side of the vertical projection in this horizontal surface of the middle portion or at one side of the vertical projection in this horizontal surface of a line extending from the main axis of the middle portion of the steel fibre.

Preferably, when a steel fibre according to the present invention is in a stable position on a horizontal surface the vertical projections on this horizontal surface none of the n bent sections of an anchorage end is located on the vertical projection of the main axis or on the vertical projection of a line extending from said main axis.

This means that only the vertical projection on this horizontal surface of the deflection section is at least partially located at the vertical projection on this horizontal surface of the main axis.

With "stable position" is meant the position in which a steel fibre remains when laid down on a horizontal surface.

The radius of curvature of the deflection section and of the bent sections is preferably ranging between 0.1 mm and 5 mm, for example between 0.5 mm and 3 mm, for example 1 mm, 1.2 mm or 2 mm.

The radius of curvature of the deflection section and of the different bent sections of an anchorage end of a steel fibre can be chosen independently from each other. This means that the radius of the deflection section, the radius of the first bent section, the radius of the second bent section, and the radius of any further bent section (if present) can be the same or can be different.

An example of a steel fibre according to the present invention comprises a steel fibre having a deflection section in which the anchorage end is deflecting from the main axis of the middle portion and an anchorage end having a two bent sections: a first bent section and a second bent section. The anchorage end is connected to one end of the middle portion in the deflection section. The first bent section is connected to the deflection section and the second bent section is connected to the first bent section. In a first example the first bent section is directly connected to the deflection section and the second bent section is directly connected to the first bent section.

An alternative example of a steel fibre according to the present invention comprises a steel fibre having a deflection section in which the anchorage end is deflecting from the main axis of the middle portion and an anchorage end having a first and a second bent section. The anchorage end is connected to one end of the middle portion in the deflection section. The first bent section is connected to the deflection bent section by a first straight section and the second bent section is connected to the first bent section by a second straight section.

The length of a straight section between two consecutive bent section is preferably ranging between 0.1 mm and 5 mm, for example 0.5 mm or 2 mm.

"Consecutive bent sections" means bent sections that are following one after the other.

The lengths of the different straight sections between two consecutive bent sections can be chosen independently from each other. This means that the different straight sections can have the same length or different lengths.

An example comprises a steel fibre having straight sections, all straight sections having a length of 2 mm.

An alternative example comprises a steel fibre having a first straight section (i.e. the straight section between the deflection section and the first bent section) having a length of 0.5 mm, a second straight section (i.e. the straight section between the first and the second bent section) having a length of 2 mm.

A steel fibre according to the present invention may be provided with one anchorage end at one end of the middle portion. Preferably, a steel fibre is provided with an anchorage end at both ends of the steel fibre. In case the steel fibre is provided with an anchorage end at both ends of the middle portion the two anchorage ends can be the same or can be different.

For a steel fibre having an anchorage end at both ends of the middle portion, both anchorage ends may be bending away (deflecting) in the same direction from the main axis of the middle portion of the steel fibre (symmetric fibres).

Alternatively, one anchorage end may be bending away (deflecting) in one direction from the main axis of the middle portion of the steel fibre while the other anchorage end is bending away (deflecting) in the opposite direction from the main axis of the middle portion of the steel fibre (asymmetric fibres).

For a steel fibre according to the present invention, the middle portion and the anchorage end is preferably situated in one plane or are substantially situated in one plane.

The other anchorage end, if any, may be situated in the same plane or in another plane.

An advantage of steel fibres according to the present invention is that they do not coagulate when being mixed with concrete or mortar. This results in a homogeneous distribution of the steel fibres over the concrete or mortar.

This in contrast to steel fibres having consecutive bents on opposite sides of the main axis of the middle portion or having consecutive bents whereby one is located on the main axis of the middle portion tend to coagulate during mixing. Coagulation of steel fibres end up in an inhomogeneous distribution of steel fibres over the concrete.

The steel fibres according to the present invention perform particularly well both at service-ability limit state (SLS) of a concrete or mortar structure and at ultimate limit state (ULS) when used at moderate or low dosage, i.e. at a dosage of less than 1 vol % or less than 0.5 vol %, for example 0.25 vol %.

It is known in the art that increasing the amount of fibres in concrete positively influences the performance of fibre reinforced concrete.

A big advantage of the present invention is that good performance at SLS and ULS is obtained with moderate or low dosage of steel fibres.

For this invention the material properties used for evaluating the performance in ULS and SLS of steel fibre reinforce concrete is the residual flexural tensile strength $f_{R,i}$. The residual flexural tensile strength is derived from the load at a predetermined crack mouth opening displacement (CMOD) or midspan deflection ($\delta_R$).

The residual flexural tensile strengths are determined by means of a three point bending test according to European Standard EN 14651 (described further in this application).

The residual flexural tensile strength $f_{R,1}$ is determined at $CMOD_1=0.5$ mm ($\delta_{R,1}=0.46$ mm), the residual flexural tensile strength $f_{R,2}$ is determined at $CMOD_2=1.5$ mm ($\delta_{R,2}=1.32$ mm), the residual flexural tensile strength $f_{R,3}$ is determined at $CMOD_3=2.5$ mm ($\delta_{R,3}=2.17$ mm) and the residual flexural tensile strength $f_{R,4}$ is determined at $CMOD_4=3.5$ mm ($\delta_{R,1}=3.02$ mm).

The residual flexural tensile strength $f_{R,1}$ is the key requirement for SLS design.

The residual flexural tensile strength $f_{R,3}$ is the key requirement for ULS design.

For steel fibres according to the present invention—contrary to the steel fibres known in the art—the ratio between the residual flexural strength $f_{R,3}$ and the residual flexural strength $f_{R,1}$ ($f_{R,3}/f_{R,1}$) is high even when low or moderate dosages of steel fibres are used as for example dosages lower than 1 vol % or dosages lower 0.5 vol %, for example 0.25 vol %. For fibres according to the present invention the ratio $f_{R,3}/f_{R,1}$ is preferably higher than 1, and more preferably higher 1.05 or higher than 1.15, for example 1.2 or 1.2 when dosages lower than 1 vol % or dosages lower than 0.5 vol %, for example 0.25 vol % are used.

For concrete reinforced with steel fibres according to the present invention with a dosage of 0.5 vol %, the residual flexural tensile strength $f_{R,3}$ using a C35/45 concrete is higher than 3.5 MPa, preferably higher than 5 MPa, more preferably higher than 6 MPa as for example 7 MPa.

Fibres known in the art as for example steel fibres having conically shaped ends (nail heads) made of low carbon steel function well for limiting the width or growth of up to about 0.5 mm (SLS). However, these fibres have a low performance at ULS. This type of steel fibres breaks at crack mouth opening displacements lower than required for ULS.

The ratio $f_{R,3}/f_{R,1}$ is lower than 1 for moderate dosages in a normal strength concrete, for example C35/45 concrete.

Other fibres known in the art are fibres with hook shaped ends as for example known from EP 851957 are designed to pull out.

Also for this type of fibres the ratio $f_{R,3}/f_{R,1}$ is lower than 1 for moderate dosages in a normal strength concrete.

Maximum Load Capacity $F_m$—Tensile Strength $R_m$

A steel fibre according to the present invention, i.e. the middle portion of a steel fibre according to the present invention preferably has a high maximum load capacity $F_m$. The maximum load capacity $F_m$ is the greatest load that the steel fibre withstands during a tensile test.

The maximum load capacity $F_m$ of the middle portion is directly related to the tensile strength $R_m$ of the middle portion as the tensile strength $R_m$ is the maximum load capacity $F_m$ divided by the original cross-section area of the steel fibre.

For a steel fibre according to the present invention, the tensile strength of the middle portion of the steel fibre is preferably above 1000 MPa and more particularly above 1400 MPa, e.g. above 1500 MPa, e.g. above 1750 MPa, e.g. above 2000 MPa, e.g. above 2500 MPa.

The high tensile strength of steel fibres according to the present invention allows the steel fibres to withstand high loads.

A higher tensile strength is thus directly reflected in a lower dosage of the fibres. However using steel fibres having a high tensile strength is only meaningful if the steel fibres show a good anchorage in the concrete.

Elongation at Maximum Load

According to a preferred embodiment the steel fibre according to the present invention, more particularly the middle portion of a steel fibre according to the present invention has an elongation at maximum load $A_{g+e}$ of at least 2.5%.

According to particular embodiments of the present invention, the middle portion of the steel fibre has an elongation at maximum load $A_{g+e}$ higher than 2.75%, higher than 3.0%, higher than 3.25%, higher than 3.5%, higher than 3.75%, higher than 4.0%, higher than 4.25%, higher than 4.5%, higher than 4.75%, higher than 5.0%, higher than 5.25%, higher than 5.5%, higher than 5.75% or even higher than 6.0%.

Within the context of the present invention, the elongation at maximum load $A_{g+e}$ and not the elongation at fraction $A_t$ is used to characterise the elongation of a steel fibre, more particularly of the middle portion of a steel fibre.

The reason is that once the maximum load has been reached, constriction of the available surface of the steel fibre starts and higher loads are not taken up.

The elongation at maximum load $A_{g+e}$ is the sum of the plastic elongation at maximum load $A_g$ and the elastic elongation.

The elongation at maximum load does not comprise the structural elongation $A_s$ which may be due to the wavy character of the middle portion of the steel fibre (if any). In case of a wavy steel fibre, the steel fibre is first straightened before the $A_{g+e}$ is measured.

The high degree of elongation at maximum load $A_{g+e}$ may be obtained by applying a particular stress-relieving treatment such as a thermal treatment to the steel wires where the steel fibres will be made of. In this case at least the middle portion of the steel fibre is in a stress-relieved state.

Steel fibres having a high ductility or a high elongation at maximum load are preferred, these fibres will not break at CMOD's above 0.5 mm, above 1.5 mm, above 2.5 mm or above 3.5 mm in the three point bending test according to EN 14651.

Anchorage Force

Preferably, the steel fibre according to the present invention has a high degree of anchorage in concrete or mortar.

By providing the middle portion of the steel fibre with anchorage ends according to the present invention the anchorage of the steel fibre in concrete or mortar is considerably improved.

A high degree of anchorage will avoid pull-out of the fibres.

A high degree of anchorage combined with a high elongation at maximum strength will avoid pull-out of the fibres, will avoid fibre failure and will avoid brittle failure of concrete in tension.

A high degree of anchorage combined with a high tensile strength allows that better use is made of the tensile strength after the occurrence of cracks.

Steel fibres according to the present invention have for example a tensile strength $R_m$ higher than 1000 MPa and an elongation at maximum load $A_{g+e}$ of at least 1.5%, a tensile strength $R_m$ of at least 1000 MPa and an elongation at maximum load $A_{g+e}$ of at least 2.5%, a tensile strength $R_m$ of at least 1000 MPa and an elongation at maximum load $A_{g+e}$ of at least 4%.

In a preferred embodiments the steel fibres have a tensile strength $R_m$ of at least 1500 MPa and an elongation at maximum load $A_{g+e}$ of at least 1.5%, a tensile strength $R_m$ of at least 1500 MPa and an elongation at maximum load $A_{g+e}$ of at least 2.5%, a tensile strength $R_m$ of at least 1500 MPa and an elongation at maximum load $A_{g+e}$ of at least 4%.

In further preferred embodiments the steel fibres have a tensile strength $R_m$ of at least 2000 MPa and an elongation at maximum load $A_{g+e}$ of at least 1.5%, a tensile strength $R_m$ of at least 2000 MPa and an elongation at maximum load $A_{g+e}$ of at least 2.5%, a tensile strength $R_m$ of at least 2000 MPa and an elongation at maximum load $A_{g+e}$ of at least 4%. Fibres having a high tensile strength $R_m$ may withstand high loads. Fibres characterised by a high elongation at maximum load $A_{g+e}$ will not break at CMODs above 0.5 mm, above 1.5 mm, above 2.5 mm or above 3 mm in the three point bending test according to EN 14651.

The middle portion of the steel fibre can be straight or rectilinear; or can be wavy or undulated. Preferably, the middle portion of the steel fibres is straight or rectilinear. In case the middle portion is wavy or undulated the main axis of the middle portion is defined as the line crossing the wavy or undulated middle portion in such a way that the total area of the upper waves or undulations above this line is the same as the total area of the waves or undulations under this line.

The steel fibres, more particularly the middle portion may have any cross-section such as a circular cross-section, a substantially circular cross-section, a rectangular cross-section, a substantially rectangular cross-section, an oval cross-section, a substantially oval cross-section, . . . .

The steel fibres, more particularly the middle portion of the steel fibres typically have a diameter D ranging between 0.10 mm to 1.20 mm, for example ranging between 0.5 mm and 1 mm, more particularly 0.7 mm or 0.9 mm. In case the cross-section of the steel fibre and more particularly of the middle portion of the steel fibre is not round, the diameter is equal to the diameter of a circle with the same surface area as the cross-section of the middle portion of the steel fibre.

The steel fibres, more particularly the middle portion of the steel fibres typically have a length to diameter ratio L/D ranging from 40 to 100.

The length of the steel fibres is for example 50 mm, 55 mm, 60 mm or 65 mm.

With length of a steel fibre is meant the total length of the steel fibre i.e. the sum of the length of middle portion and the length of the anchorage end or anchorage ends.

The middle portion has preferably a length higher than 25 mm, for example higher than 30 mm, higher than 40 mm or higher than 45 mm.

The steel fibre or part of the steel fibre can be flattened or can be provided with one or more flattened sections. For example the middle portion, part of the middle portion, an anchorage end or part of an anchorage end can be flattened or can be provided with one or more flattened sections.

If the middle portion is provided with one or more flattened sections, the flattened section or sections is/are preferably located close to but not immediately adjacent to the anchorage end or anchorage ends.

According to a second aspect a reinforced concrete structure comprising a concrete structure reinforced with steel fibres according to the present invention is provided. The reinforced concrete structure may or may not be reinforced with traditional reinforcement (for example pre-stressed or post-tensioned reinforcement) in addition to the steel fibres according to the present invention.

For a reinforced concrete structure reinforced with steel fibres according to the present invention the ratio residual flexural tensile strength $f_{R,3}$/residual flexural tensile strength $f_{R,1}$ ($f_{R,3}/f_{R,3}$) is preferably higher than 1 and more preferably higher than 1.05, higher than 1.15 or higher than 1.2, for example 1.3. This ratio is reached when low dosages of steel fibres are used, for example a dosage lower than 1 vol % or a dosage lower than 0.5 vol %, or even with a dosage of 0.25 vol %.

The residual flexural tensile strength $f_{R,3}$ of a reinforced concrete structure using steel fibres according to the present invention is preferably higher than 3.5 MPa, more preferably the residual flexural tensile strength $f_{R,3}$ is higher than 4.5 MPa, higher than 5 MPa or even higher than 6 MPa.

The concrete structure reinforced with fibres according to the present invention has an average post crack residual strength at ULS exceeding 3 MPa, e.g. more than 4 MPa, e.g. more than 5 MPa, 6 MPa, 7 MPa, 7.5 MPa. By using steel fibres according to the present invention, concrete structures having an average post crack residual strength at ULS exceeding 3 MPa or exceeding 4 MPa can be reached using C35/45 concrete and using dosages of less than 1 vol % or even less then 0.5 vol %.

According to the present invention preferred reinforced concrete structures have an average post crack residual strength at ULS exceeding 5 MPA using C35/45 concrete and using dosages of less than 1 vol % or even less than 0.5 vol %.

It is important to notice that reinforced concrete structures having an average post crack residual strength at ULS exceeding 3 MPa or 5 MPa are existing. However, these reinforced concrete structure known in the art use high dosages of steel fibres (above 0.5 vol % or above 1 vol %) in normal strength concrete or high strength concrete or use moderate dosages of high strength fibres in high strength concrete.

According to a third aspect the use of steel fibres according to the present invention for load carrying structures of concrete is provided.

BRIEF DESCRIPTION OF FIGURES IN THE DRAWINGS

The invention will now be described into more detail with reference to the accompanying drawings where FIG. 1 illustrates a tensile test (load-strain test) of a steel fibre;

FIG. 10a, FIG. 10b, FIG. 10c, FIG. 10d and FIG. 10e illustrate some further embodiments of steel fibres some embodiments according to the present invention and some prior art steel fibres.

MODE(S) FOR CARRYING OUT THE INVENTION

Figure 1:
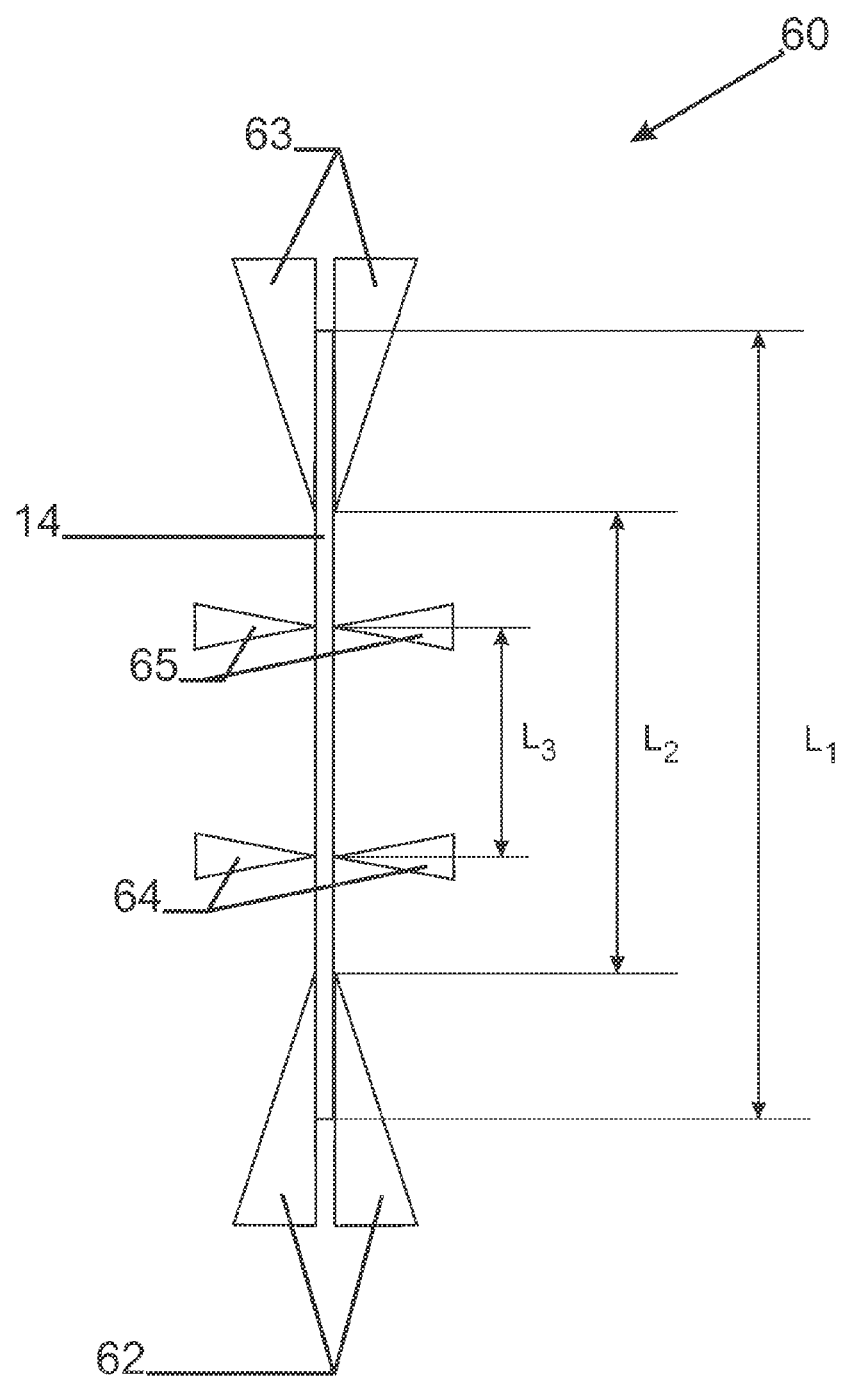

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The following terms are provided solely to aid in the understanding of the inventions.

Maximum load capacity ($F_m$): the greatest load which the steel fibre withstands during a tensile test;

Elongation a maximum load (%): increase in the gauge length of the steel fibre at maximum force, expressed as a percentage of the original gauge length;

Elongation at fracture (%): increase in the gauge length at the moment of fracture expressed as a percentage of the original gauge length;

Tensile strength ($R_m$): stress corresponding to the maximum load ($F_m$);

Stress: force divided by the original cross-sectional area of the steel fibre;

Dosage: quantity of fibres added to a volume of concrete (expressed in kg/m$^3$ or in vol % (1 vol % corresponds with 78.5 kg/m$^3$, 0.5 vol % corresponds with 40 kg/m$^3$));

Normal strength concrete: concrete having a strength less than or equal to the strength of concrete of the C50/60 strength classes as defined in EN206.

High strength concrete: concrete having a strength higher than the strength of concrete of the C50/60 strength classes as defined in EN 206.

To illustrate the invention a number of different steel fibres, both prior art steel fibres and steel fibres according to the present invention are subjected to two different tests:
- a tensile test (load-strain test); and
- a three point bending test (load-crack mouth opening displacement curve or a load-deflection curve).

The tensile test is applied on the steel fibre, more particularly on the middle portion of the steel fibre. Alternatively, the tensile test is applied on the wire used to make the steel fibre.

The tensile test is used to determine the maximum load capacity $F_m$ of the steel fibre and to determine the elongation at maximum load $A_{g+e}$.

The three point bending test is applied on a notched reinforced beam as specified in EN 14651.

The test is used to determine the residual tensile strengths.

Figure 2:
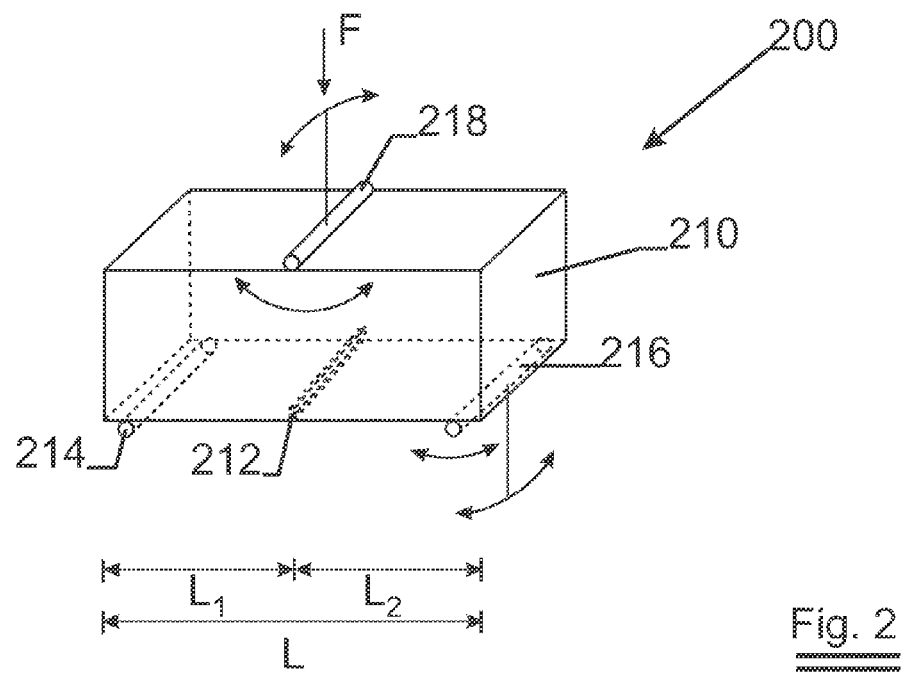
FIG. 2 illustrates a three point bending test (load-crack mouth opening displacement curve or a load-deflection curve)

The tests are illustrated in FIG. 1 and FIG. 2 respectively.

FIG. 1 shows a test set up 60 of a tensile test (load-strain test) of a steel fibre). With the help of the test set up 60 steel fibres are tested as to maximum load capacity $F_m$ (breaking load), tensile strength $R_m$ and total elongation at maximum load $A_{g+e}$.

The anchorage ends (for example the enlarged or hook shaped ends) of the steel fibre to be tested are cut first. The remaining middle portion 14 of the steel fibre is fixed between two pairs of clamps 62, 63. Through the clamps 62, 63 an increasing tensile force F is exercised on the middle portion 14 of the steel fibre. The displacement or elongation as a result of this increasing tensile force F is measured by measuring the displacement of the grips 64, 65 of the extensometer. $L_1$ is the length of the middle portion of the steel fibre and is e.g. 50 mm, 60 mm or 70 mm. $L_2$ is the distance between the clamps and is e.g. 20 mm or 25 mm. $L_3$ is the extensometer gauge length and is minimum 10 mm, e.g. 12 mm, e.g. 15 mm. For an improved grip of the extensometer to the middle portion 14 of the steel fibre, the middle portion of the steel fibre can be coated or can be covered with a thin tape to avoid slippery of the extensometer over the steel fibre. By this test a load-elongation curve is recorded.

The percentage total elongation at maximum load is calculated by the following formula:

$$A_{g+e} = \frac{\text{extension at maximum load}}{\text{extensometer gauge length } L_3} \times 100$$

With the help of setup 60 of FIG. 1, a number of different wires are tested as to maximum load capacity $F_m$ (breaking load), tensile strength $R_m$ and total elongation at maximum load $A_{g+e}$.

Five tests per specimen are done. Table 1 gives an overview of the wires that are tested.

TABLE 1

| Wire type | Carbon content | Diameter (mm) | $F_m$ (N) | $R_m$ (MPa) | $A_{g+e}$ (%) |
|---|---|---|---|---|---|
| 1 | Low | 1.0 | 911 | 1160 | 1.86 |
| 2 | Low | 0.9 | 751 | 1181 | 2.16 |
| 3 | High | 0.89 | 1442 | 2318 | 5.06 |
| 4 | Medium | 0.75 | 533 | 1206 | 2.20 |
| 5 | Medium | 0.90 | 944 | 1423 | 1.84 |

Low carbon steel is defined as steel having a carbon content of maximum 0.15%, for example 0.12%; medium carbon steel is defined as steel having a carbon content ranging between 0.15% and 0.44%, for example 0.18% and high carbon steel is defined as steel having a carbon content higher than 0.44%, for example 0.5% or 0.6%.

FIG. 2 shows the experimental set up 200 of a three point bending test. The three point bending test was performed at 28 days according to European Standard EN 14651 using a 150×150×600 mm prismatic specimen 210. In the mid-span of the specimen 210 a single notch 512 with a depth of 25 mm was sawn with a diamond blade to localize the crack. The set up comprises two supporting rollers 214, 216 and one loading roller 218. The set up is capable of operating in a controlled manner, i.e. producing a constant rate of displacement (CMOD or deflection). The tests were carried out with a displacement rate as specified in EN 14651. A load-crack mouth opening displacement curve or a load-deflection curve is recorded.

Figure 3:
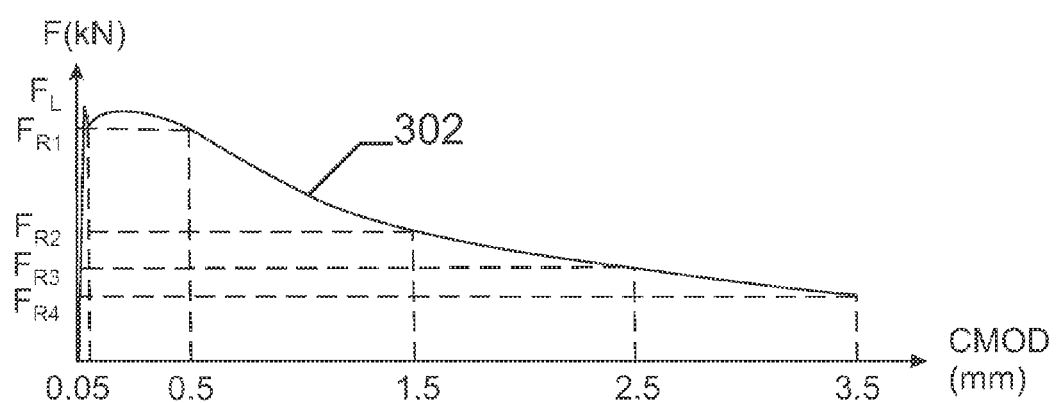
FIG. 3 illustrates a load-crack mouth opening displacement curve.

An example of a load-crack mouth opening displacement curve 302 is given in FIG. 3.

The residual flexural strength $f_{R,i}$ (i=1, 2, 3 or 4) are assessed according to EN 14651 and can be calculated by the following expression:

$$f_{R,i} = \frac{3F_{R,i}L}{2bh_{sp}^2} \text{ (N/mm}^2\text{)}$$

with:
$F_{R,i}$=the load corresponding with CMOD=CMOD$_i$ or $\delta=\delta_{R,i}$ (i=1, 2, 3, 4);
b=width of the specimen (mm);
$h_{sp}$=distance between tip of the notch and the top of the specimen (mm);
L=span length of the specimen (mm).

Some embodiments of steel fibres according to the present invention are described below.

Figure 4:
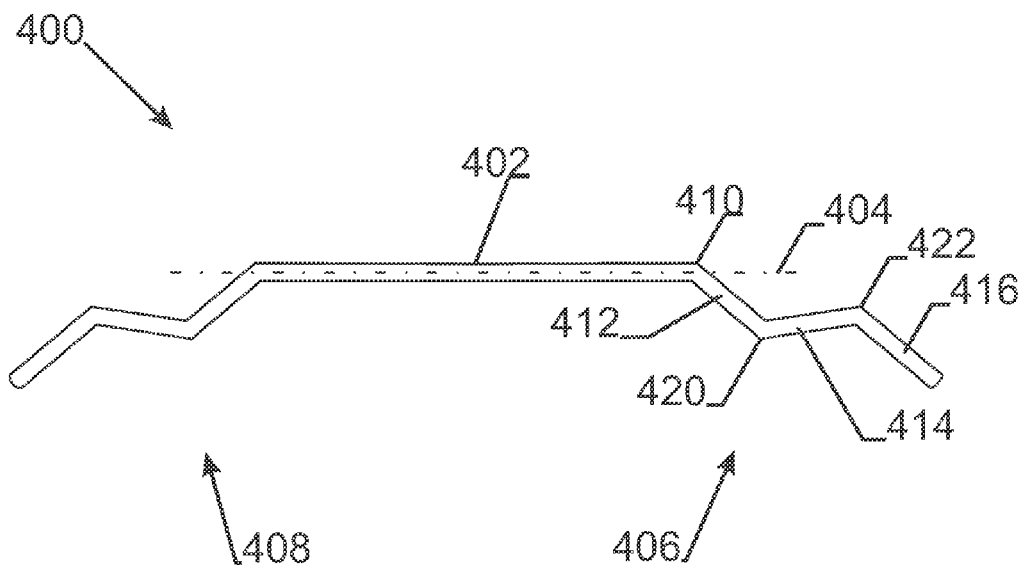
FIG. 4, FIG. 5, FIG. 6 and FIG. 7 illustrate a number of different steel fibres according to the present invention.

A first steel fibre 400 is shown in FIG. 4. The steel fibre 400 comprises a middle portion 402 having a main axis 404. The steel fibre 400 has two anchorage ends 406, 408, one at each end of the middle portion 402. The anchorage ends 406, 408 are deflecting from the main axis 404 of the middle portion 402 in deflection section 410. The anchorage ends 406, 408 are deflecting from the main axis 404 in a deflection section 410. In the embodiment shown in FIG. 4 both anchorage ends are deflecting in the same direction from the main axis 404 of the middle portion 402. However, it is clear for a person skilled in the art that also embodiments with anchorage ends deflecting in different directions can be considered.

Both anchorage ends 406, 408 have two bent sections : a first bent section 420 and a second bent section 422. The first bent section 420 is connected to the deflection section 410 by a first straight section 412; the second bent section 422 is connected to the first bent section 420 by a second straight section 414. The anchorage ends 406, 408 further comprise a third straight section 416 connected to the second section 422.

The second straight section 414 is bending towards the main axis 404 of the middle portion 402 in bent section 420; the third straight section 416 is bending away from the main axis 404 of the middle portion 402 in bent section 422. When the steel fibre 400 being in a stable position on a horizontal surface is vertically projected on this horizontal surface, the vertical projections the first bent section 420 and of the second bent section 422 are located at one side of the vertical projection on this horizontal surface of the main axis 404 of the middle portion 402 of the steel fibre 400.

None of the vertical projections of the first bent section 420 of the second bent section 422 is located on the vertical projection of the main axis 404 of the middle portion 402 of the steel fibres 400.

Figure 5:
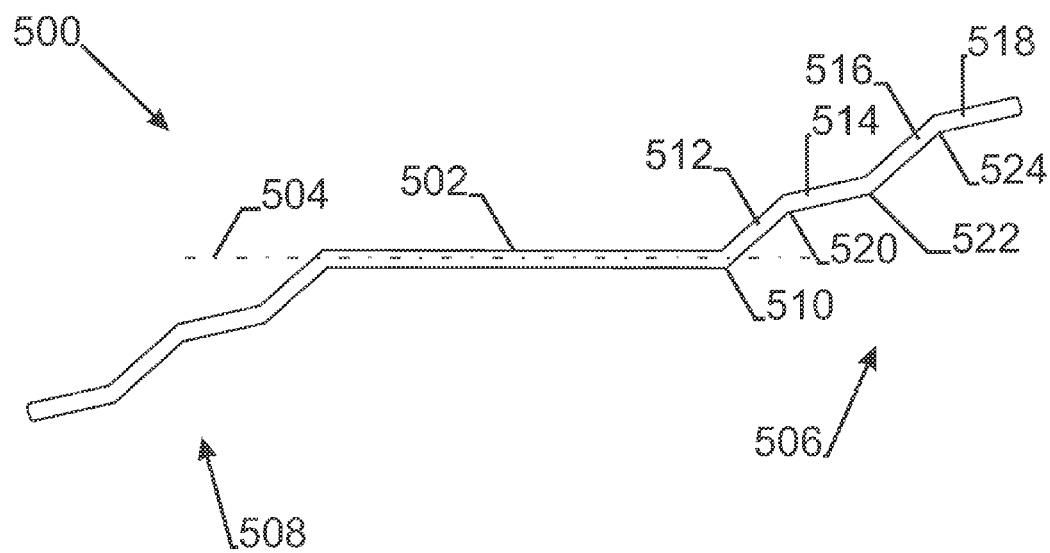

A second embodiment of a steel fibre 500 according to the present invention is shown in FIG. 5. The steel fibre 500 comprises a middle portion 502 having a main axis 504. The steel fibre 500 has two anchorage ends 506, 508, one at each end of the middle portion 502. Both anchorage ends 506, 508 are deflecting from the main axis 504 in deflection section 510. In the embodiment shown in FIG. 5 both anchorage ends are deflecting in opposite direction from the main axis 504 of the middle portion 502.

Both anchorage ends 506, 508 comprise three bent sections: a first bent section 520, a second bent section 522 and a third bent section 524. The first bent section 520 is connected to the deflection section 510 by a first straight section 512; the second bent section 522 is connected to the first bent section 520 by a second straight section 514; the third bent section 524 is connected to the second bent section 522 by a third straight section 516. The anchorage ends 506, 506 further comprise a fourth straight section 418 connected to the third bent section 524.

The second straight section 514, the third straight section 516 and the fourth straight section are all bending away from the main axis 504 of the middle portion 502 respectively in the first bent section 520, the second bent section 522 and the third bent section 524.

When the steel fibre 500 being in a stable position on a horizontal surface is vertically projected on this horizontal surface, the vertical projections of the first bent section 520, of the second bent section 522 and of the third bent section 524 are located at one side of the vertical projection on this horizontal surface of the main axis 504 of the middle portion 502 of the steel fibre 500.

None of the vertical projections of the first bent section 520, of the second bent section 522 or of the third bent section is located on the vertical projection of the main axis 504 of the middle portion 502 of the steel fibres 500.

Figure 6:
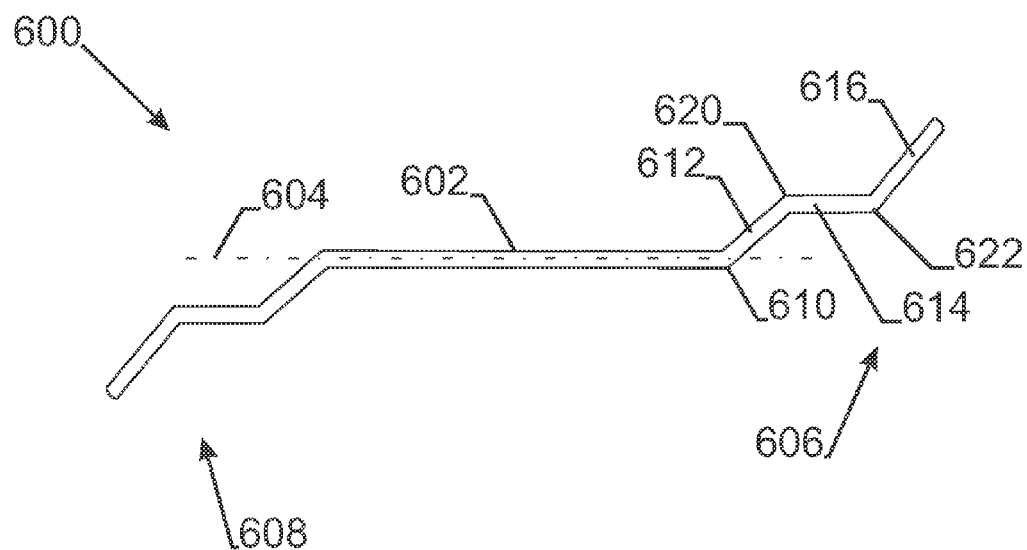

A third embodiment of a steel fibre 600 according to the present invention is shown in FIG. 6. The steel fibre 600 comprises a middle portion 602 having a main axis 604. The steel fibre 600 has two anchorage ends 606, 608, one at each end of the middle portion 602. Both anchorage ends 606, 608 are deflecting from the main axis 604 in deflection section 610. In the embodiment shown in FIG. 6 both anchorage ends are deflecting in opposite directions from the main axis 604 of the middle portion 602.

Both anchorage ends 606, 608 two bent sections: a first bent section 620 and a second bent section 622. The first bent section 620 is connected to the deflection section 610 by a first straight section 612; the second bent section 622 is connected to the first bent section 620 by a second straight section 614.

The anchorage ends 606, 606 further comprise a third straight section 616 connected to the second bent section 622.

The second straight section 614 is oriented parallel or substantially parallel with the main axis 604 of the middle portion 602. The third straight section 624 is bending away from the main axis 604 of the middle portion 602 is bent section 622.

When the steel fibre 600 being in a stable position on a horizontal surface is vertically projected on this horizontal surface, the vertical projections the first bent section 620 and of second bent section 622 are located at one side of the vertical projection on this horizontal surface of the main axis 604 of the middle portion 602 of the steel fibre 600.

None of the vertical projections of the first bent section 620 or of the second bent section 622 is located on the vertical projection of the main axis 604 of the middle portion 602 of the steel fibres 600.

Figure 7:
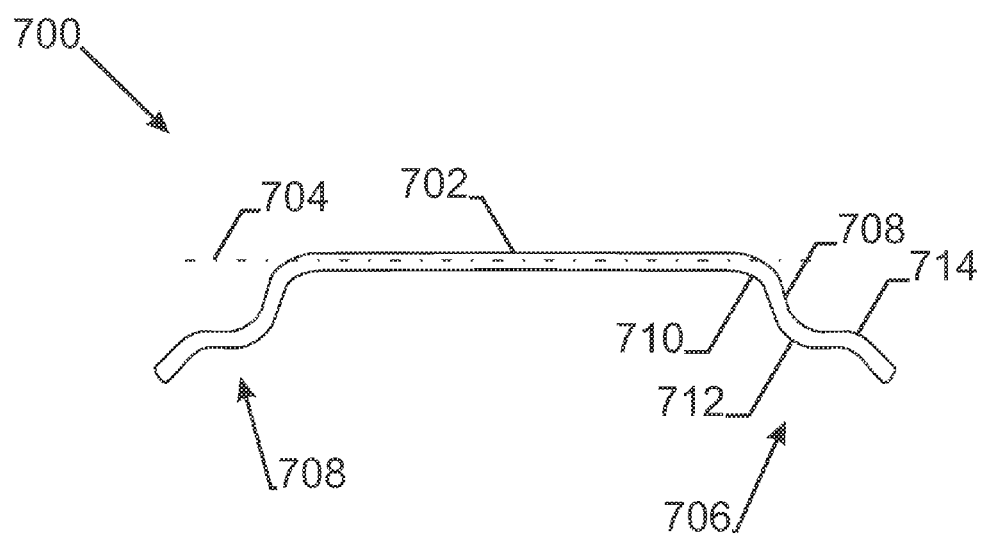

FIG. 7 shows a further embodiment of a steel fibre 700 according to the present invention. The steel fibre 700 has two anchorage ends 706, 708, one at each end of the middle portion 702.

Both anchorage ends are deflecting from the main axis 704 in deflection section 710.

Both anchorage ends 706, 708 comprise two bent sections: a first bent section 712 and a second bent section 714. The first bent section 712 is directly connected to deflection section 710; the second bent section 714 is directly connected to the first bent section 712.

When the steel fibre 700 being in a stable position on a horizontal surface is vertically projected on this horizontal surface, the vertical projections on this horizontal surface of the first bent section 712 and the second bent section 714 are located on one side of the vertical projection on this horizontal surface of the main axis 704 of the middle portion of the steel fibre 700.

Figure 8:
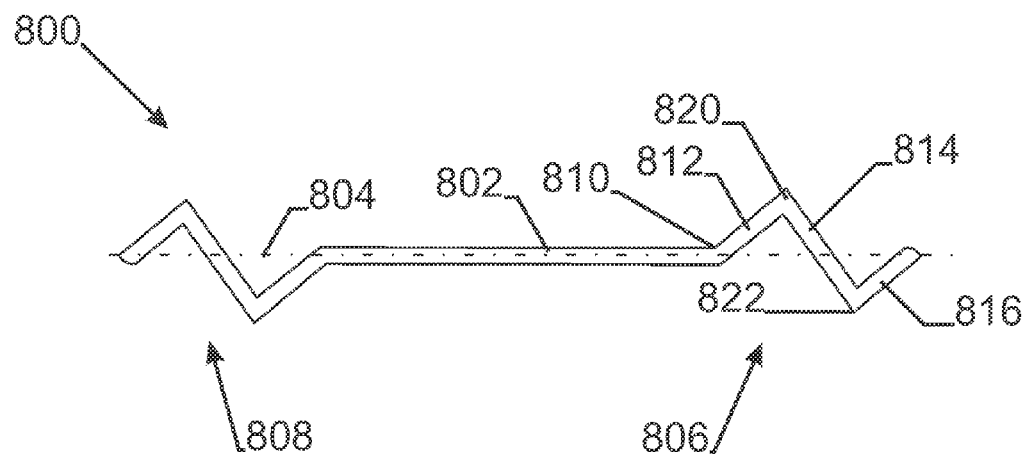
FIG. 8 and FIG. 9 illustrate a number of different steel fibres provided with anchorage ends that do not meet the requirements of the present invention.
Figure 9:
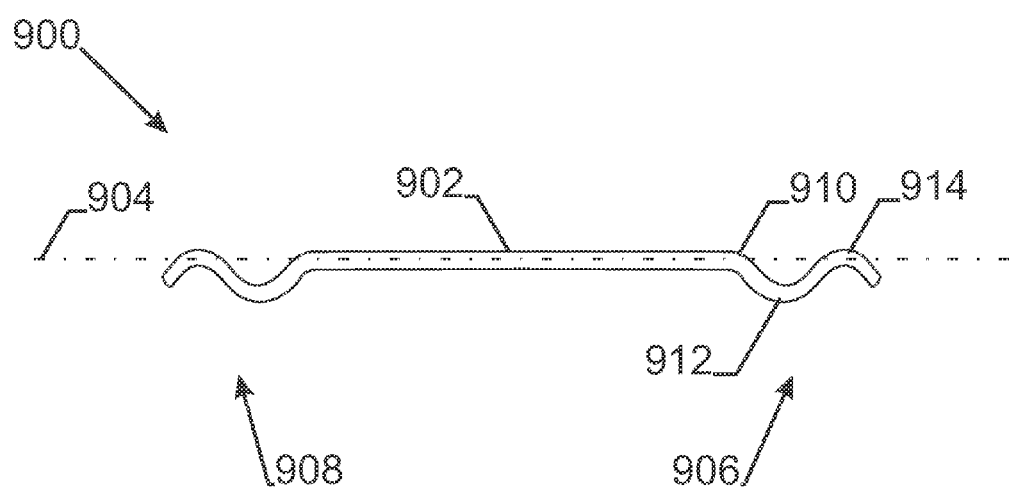

FIG. 8 and FIG. 9 show two embodiments of steel fibres that do not meet the requirements of the present invention.

FIG. 8 shows steel fibre 800 having a middle portion 802 having a main axis 804. The steel fibre 800 has two anchorage ends 806, 808, one at each end of the middle portion 802. Both anchorage ends are connected to the middle portion 802 by deflection section 810. Both anchorage ends 806, 808 comprise 3 straight sections: a first straight section 812, a second straight section 814 and a third straight section 816. The anchorage ends 806, 808 comprise two bent sections: a first bent section 820 and a second bent section 822.

When the steel 800 being in a stable position on a horizontal surface is vertically projected on this horizontal surface, the vertical projections on this horizontal surface of the first bent section 820 and of the second bent section 822 are located at opposite sides of the vertical projection of the main axis 804 of the middle portion 802 of steel fibre 800.

A drawback of this type of steel fibres is that these fibres tend to coagulate during mixing. The steel fibres entangle and balls are formed during mixing.

The result is the steel fibres are not homogenously distributed in concrete or mortar.

FIG. 9 shows steel fibre 900 having a middle portion 902 having a main axis 904. The steel fibre has two anchorage ends 906, 908, one at each end of the middle portion 902. Both anchorage ends 906, 908 are connected to the middle portion 902 by deflection section 910. Both anchorage ends 906, 908 comprise two bent sections: a first bent section 912 and a second bent section 914. The first bent section 912 is directly connected to deflection section 910; the second bent section 914 is directly connected to the first bent section 912.

When the steel 900 being in a stable position on a horizontal surface is vertically projected on this horizontal surface, the vertical projection on this horizontal surface of the first bent section 912 is located on one side of the vertical projection of the main axis 904 of the middle portion 902 of steel fibre 900. The vertical projection on this horizontal surface of the second bent section 914 is located on the vertical projection of the main axis 904 of the middle portion 902 of steel fibre 900.

A drawback of this type of steel fibres is that these fibres tend to coagulate during mixing. The steel fibres entangle and balls are formed during mixing.

The result is the steel fibres are not homogenously distributed in concrete or mortar.

With the help of setup 200 of FIG. 2, the performance of a number of different steel fibres (FIB1 till FIB5) in concrete is tested. For the test the steel fibres are embedded in C35/45 concrete. The curing time was 28 days.

An overview of the steel fibres that are tested is given in Table 2. The test results of the prior art steel fibres (FIB1 and FIB5) are given in Table 3. The test results of the steel fibres according to the present (FIB2, FIB3 and FIB4) invention are given in Table 4.

The steel fibres are specified by the length of the steel fibre, the wire type used to make the steel fibre, the diameter of the steel fibre (more particularly the diameter of the middle portion of the steel fibre), the number of straight sections of the anchorage end, the included angle between the main axis of the middle portion and the main axis of the first straight section, the orientation of the second straight section towards the middle portion, the included angle between the main axis of the second straight section and the main axis of the third straight section, the orientation of the fourth straight section towards the middle portion, the included angle between the main axis of the fourth straight section and the main axis of the fifth straight section.

The geometry of the different fibres is shown in FIG. 10a to FIG. 10e. All tested fibres 1000 have anchorage ends 1002 at both ends of the middle portions 1004.

Figure 10A:
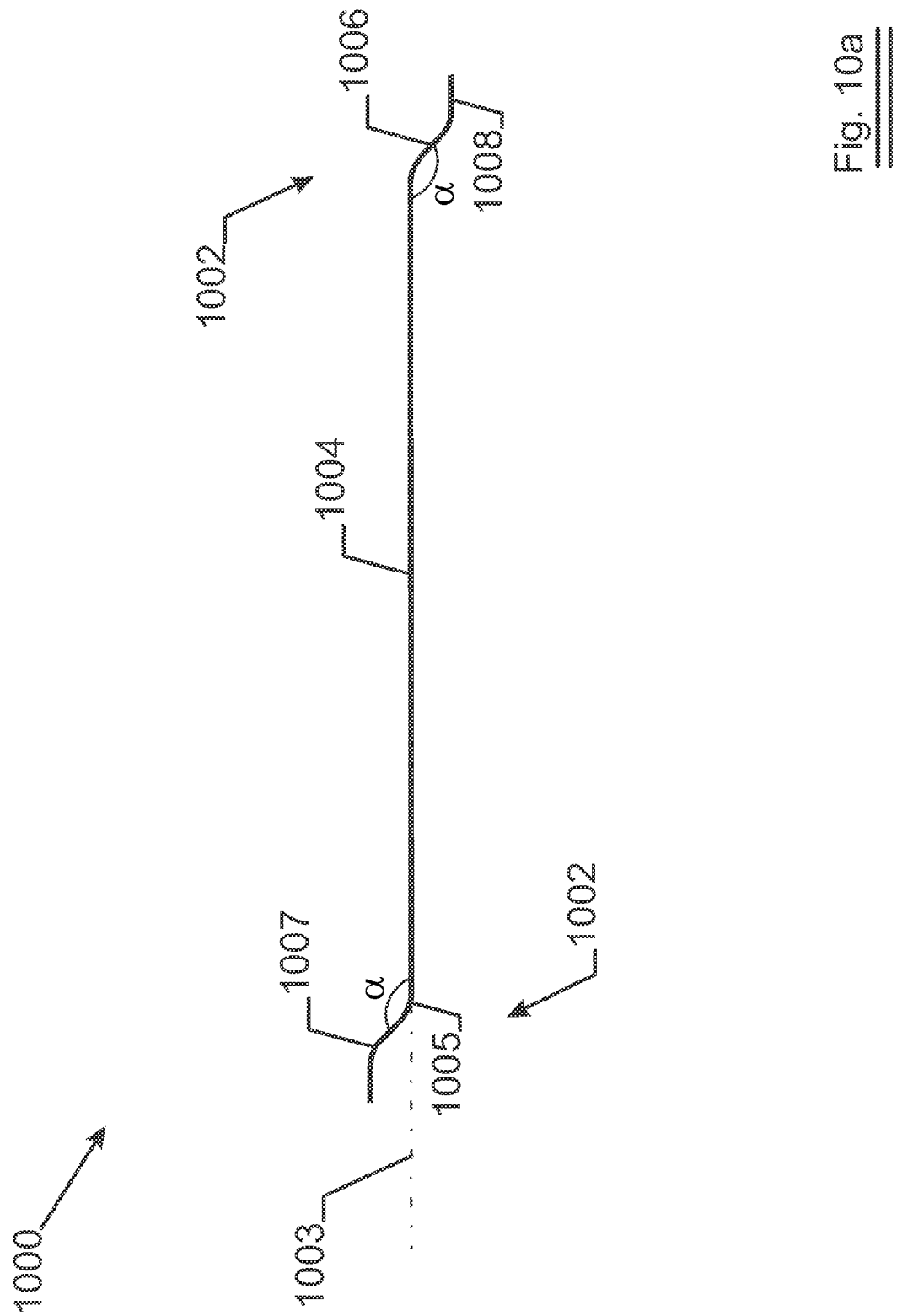
Figure 10C:
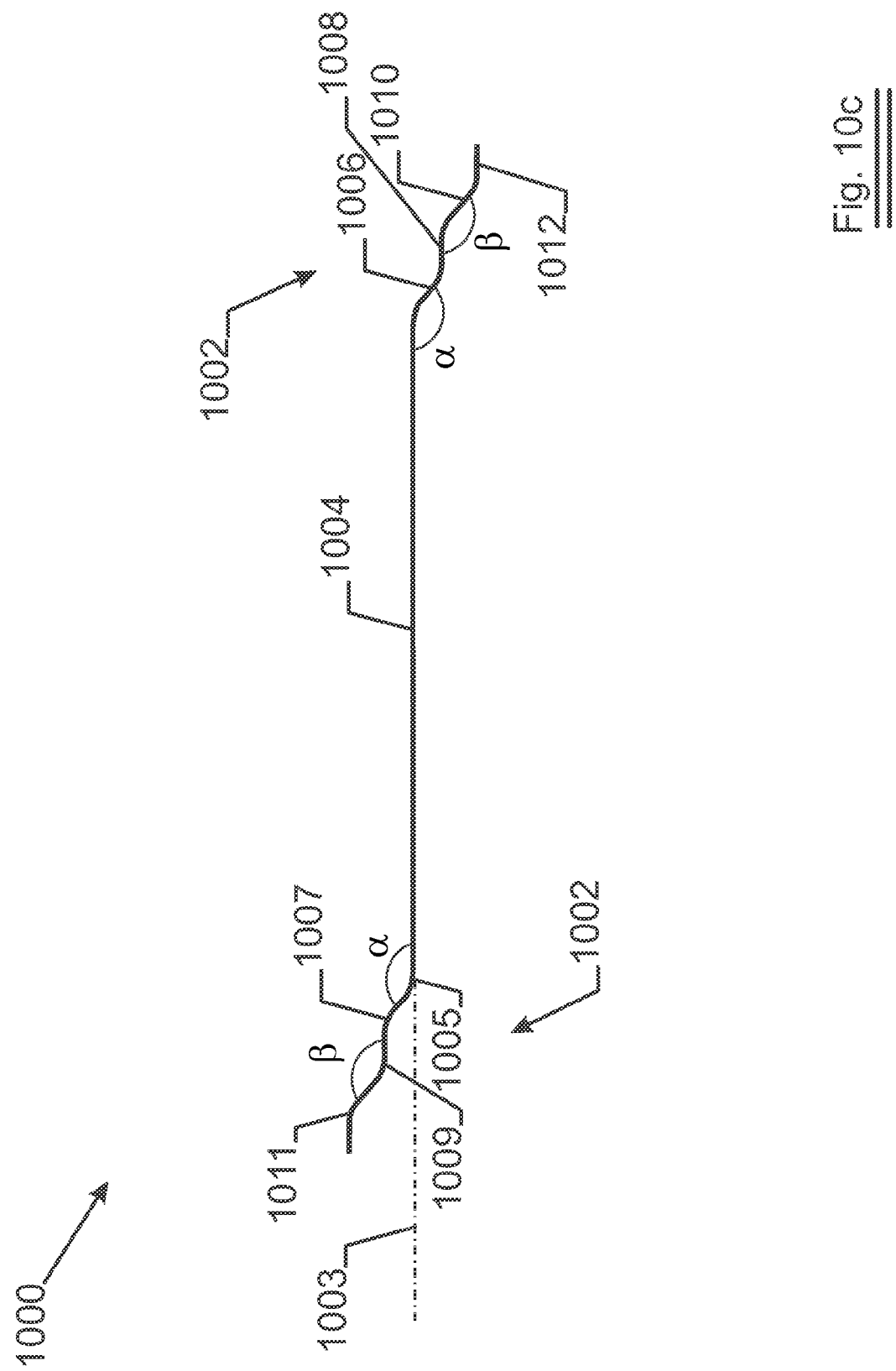
Figure 10D:
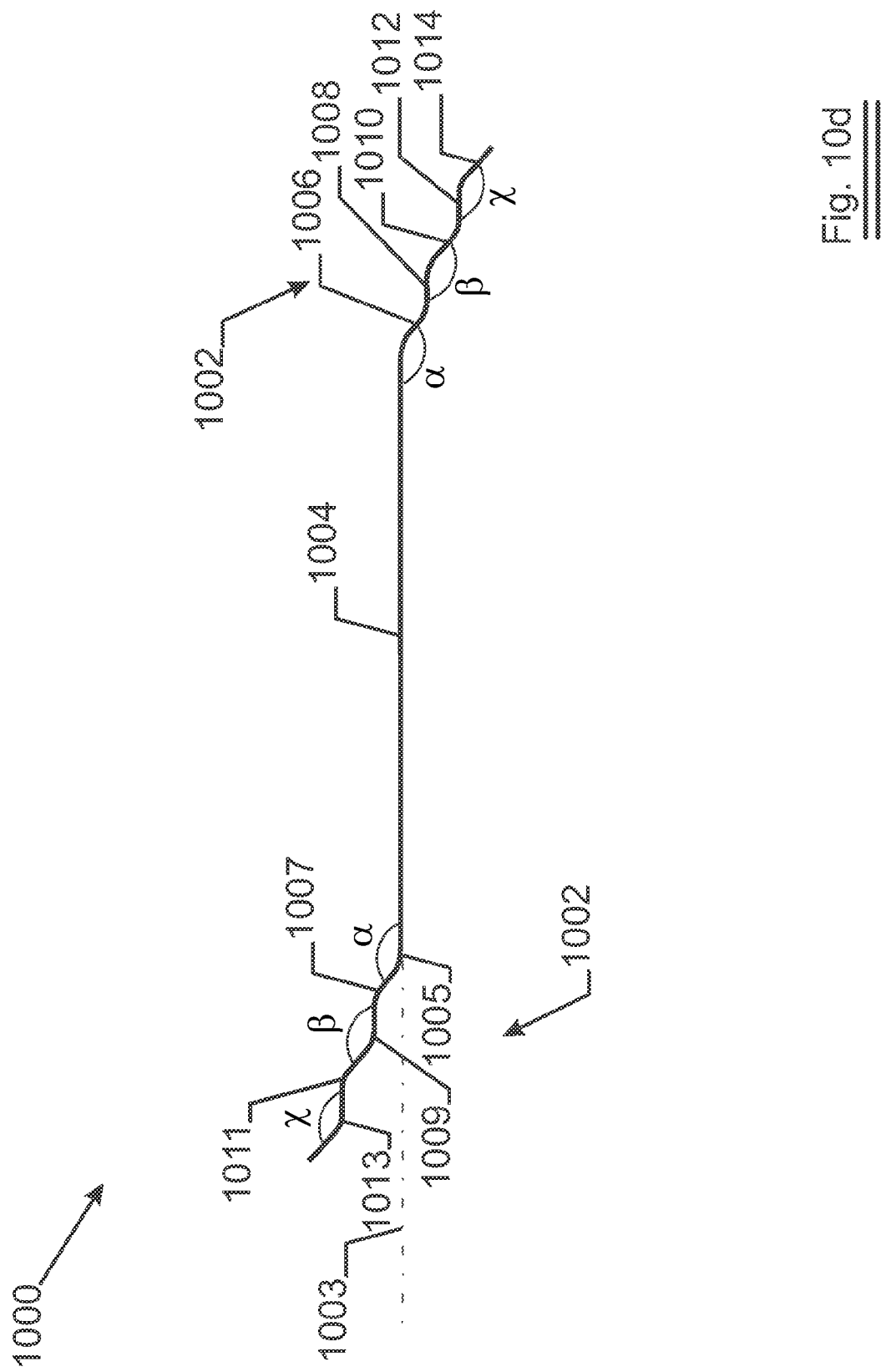
Figure 10E:
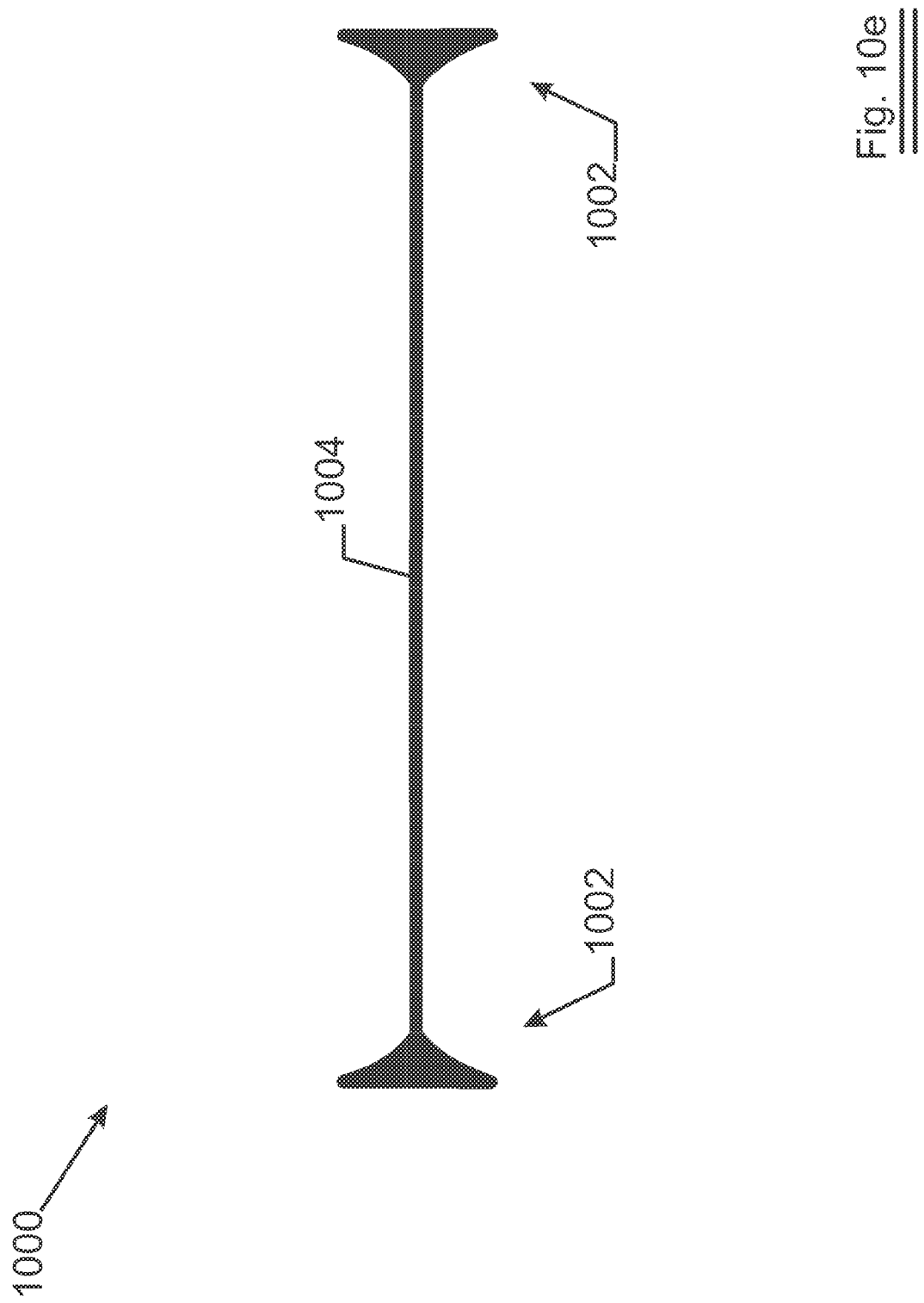

FIB1 and FIB5 are prior art fibres. FIB1 is a low carbon fibre having anchorage ends with two straight sections and one bent section (FIG. 10a). FIB5 is a fibre having at both ends a nail head as anchorage end (FIG. 10e).

FIB2, FIB3 and FIB4 are fibres according to the present invention. FIB2 has anchorage ends with 2 bent sections and 3 straight sections (FIG. 10b). FIB3 has anchorage ends with 3 bent sections and 4 straight sections (FIG. 10c). FIB4 has anchorage ends with 4 bent sections and 5 straight sections (FIG. 10d).

Two straight sections with a common vertex define two angle. The sum of these two angle is equal to 360°. For the purpose of this invention the smallest of the two angles defined by two straight sections with a common vertex is called the "included angle".

This means that the included angle between the main axis of the middle portion and the main axis of the first straight section is defined as the angle made by the main axis of the middle portion and the main axis of the first straight section. Similarly, the included angle between the main axis of the second straight section and the main axis of the third straight section is made by the main axis of the second straight section and the main axis of the third straight section.

The steel fibre 1000 shown in FIG. 10a comprises a middle portion 1004 and an anchorage end 1002 at both ends of the middle portion 1004. The middle portion 1004 has a main axis 1003. Each of the anchorage ends 1002 is deflecting from the main axis 1003 of the middle portion 1004 in deflection section 1005. Each of the anchorage ends 1002 comprises a first straight section 1006, a first bent section 1007 and a second straight section 1008. The included angle between the main axis 1003 of the middle portion 1004 and the main axis of the first straight section 1006 is indicated by α.

The second straight section 1008 is parallel or substantially parallel with the main axis 1003 of the middle portion 1004.

The steel fibre 1000 shown in FIG. 10b comprises a middle portion 1004 and an anchorage end 1002 at both ends of the middle portion 1004. The middle portion has a main axis 1003. Each of the anchorage ends 1002 is deflecting from the main axis 1003 of the middle portion 1004 in deflection section 1005. Each of the anchorage ends 1002 comprises a first straight section 1006, a first bent section 1007, a second straight section 1008, a second bent section 1009 and a third straight section 1010. The included angle between the main axis 1003 of the middle portion 1004 and the main axis of the first straight section 1006 is indicated by α. The included angle between the main axis of the second straight section 1008 and the main axis of the third straight section 1010 is indicated by β.

The second straight section 1008 is parallel or substantially parallel with the main axis 1003 of the middle portion 1004.

The steel fibre 1000 shown in FIG. 10c comprises a middle portion 1004 and an anchorage end 1002 at both ends of the middle portion 1004. The middle portion has a main axis 1003. Each of the anchorage ends 1002 is deflecting from the main axis 1003 of the middle portion 1002 in deflection section 1005. Each of the anchorage ends 1002 comprises a first straight section 1006, a first bent section 1007, a second straight section 1008, a second bent section 1009, a third straight section 1010, a third bent section 1011 and a fourth straight section 1012. The included angle between the main axis 1003 of the middle portion 1004 and the main axis of the first straight section 1006 is indicated by α. The included angle between the main axis of the second straight section 1008 and the main axis of the third straight section 1010 is indicated by β.

The second straight section 1008 and the fourth straight section are parallel or substantially parallel with the main axis 1003 of the middle portion 1004.

The steel fibre 1000 shown in FIG. 10d comprises a middle portion 1004 and an anchorage end 1002 at both ends of the middle portion 1004. The middle portion 1004 has a main axis 1003. Each of the anchorage ends 1002 is deflecting from the main axis 1003 of the middle portion 1004 in deflection section 1005. Each of the anchorage ends 1002 comprises a first straight section 1006, a first bent section 1007, a second straight section 1008, a second bent section 1009, a third straight section 1010, a third bent section 1011, a fourth straight section 1012, a fourth bent section 1013 and a fifth straight section 1014. The included angle between the main axis 1003 of the middle portion 1004 and the main axis of the first straight section 1006 is indicated by α. The included angle between the main axis of the second straight section 1008 and the main axis of the third straight section 1010 is indicated by β. The included angle between the mains axis of the fourth straight section 1012 and the main axis of the fifth straight section 1014 is indicated by γ.

The second straight section 1008 and the fourth straight section 1012 are parallel or substantially parallel with the main axis 1003 of the middle portion 1004.

The fibre shown in FIG. 10e comprises a middle portion 1004 provided at both ends of the middle portion 1004 with anchorage ends 1002. The anchorage ends 1002 comprise nail heads.

TABLE 2

| Fibre type | Length (mm) | Wire type | Diameter (mm) | Number of straight sections | α (degrees) | 2nd straight section parallel with main axis middle portion (yes/no) | β (degrees) | 4th straight section parallel with main axis middle portion (yes/no) | γ (degrees) | FIG. |
|---|---|---|---|---|---|---|---|---|---|---|
| FIB1 | 60 | 2 | 0.90 | 2 | 140 | Yes | / | / | / | FIG. 10a |
| FIB2 | 60 | 3 | 0.89 | 3 | 140 | Yes | 140 | / | / | FIG. 10b |
| FIB3 | 60 | 3 | 0.89 | 4 | 140 | Yes | 140 | Yes | / | FIG. 10c |
| FIB4 | 60 | 3 | 0.89 | 5 | 140 | Yes | 140 | Yes | 140 | FIG. 10d |
| FIB5 | 54 | 1 | 1.00 | / | / | / | / | / | / | FIG. 10e |

α Included angle between the main axis of the middle portion and the main axis of the 1st straight section
β Included angle between the main axis of the 2nd straight section and the main axis of the 3rd straight section
γ Included angle between the main axis of the 4th straight section and the main axis of the 5th straight section

TABLE 3

| Fiber type | Dosage (kg/m³) | $f_L$ | $f_{R,1}$ | $f_{R,2}$ | $f_{R,3}$ | $f_{R,3}/f_{R,1}$ |
|---|---|---|---|---|---|---|
| FIB1 | 40 | 5.48 | 3.75 | 3.85 | 3.68 | 0.98 |
| FIB5 | 40 | 5.80 | 4.11 | 4.31 | 2.83 | 0.69 |

TABLE 4

| Fiber type | Dosage (kg/m³) | $f_L$ | $f_{R,1}$ | $f_{R,2}$ | $f_{R,3}$ | $f_{R,3}/f_{R,1}$ |
|---|---|---|---|---|---|---|
| FIB2 | 40 | 5.81 | 5.02 | 6.01 | 5.89 | 1.17 |
| FIB3 | 40 | 5.79 | 5.76 | 7.40 | 7.46 | 1.30 |
| FIB3 | 20 | 5.56 | 3.06 | 3.51 | 3.54 | 1.16 |
| FIB4 | 40 | 5.89 | 5.23 | 6.65 | 6.75 | 1.29 |

From Table 3 and Table 4 it can be concluded that the ratio $f_{R,3}/f_{R,1}$ of the prior art fibres (FIB1 and FIB5) is below 1 whereas the ratio $f_{R,3}/f_{R,1}$ of the steel fibres according to the present invention (FIB2, FIB3 and FIB4) is higher than 1.

The residual flexural tensile strengths $f_{R,1}$, $f_{R,2}$ and $f_{R,3}$ of the prior art fibres (FIB1 and FIB5) are low, i.e. considerably lower than the residual flexural tensile strengths $f_{R,1}$, $f_{R,2}$ and $f_{R,3}$ of the fibres according to the invention (FIB2, FIB3 and FIB4).

Comparing the steel fibres according to the present invention (FIB2, FIB3 and FIB4) using a dosage of 40 kg/m³ with the prior art steel fibres (FIB1 and FIB5) using a dosage of 40 kg/m³, the residual flexural tensile strengths $f_{R,1}$, $f_{R,2}$ and $f_{R,3}$ of the steel fibres according to the present invention are considerably higher than for the prior art fibres.

Steel fibre FIB3 is tested in two different dosages: 20 kg/m³ and 40 kg/m³.

Even when a fibre dosage of 20 kg/m³ is used the ratio $f_{R,3}/f_{R,1}$ is exceeding 1. This indicates that such steel fibres behave like traditional reinforcing steel (stress-strain based instead of stress-crack opening based).

Comparing the steel fibres FIB2, FIB3 and FIB4 it can be concluded that the residual flexural tensile strengths $f_{R,1}$, $f_{R,2}$ and $f_{R,3}$ are increasing by increasing the number of straight sections from 3 to 4.

Also the ratio $f_{R,3}/f_{R,1}$ is increasing by increasing the number of straight sections from 3 to 4.

By increasing the number of straight sections from 4 to 5, the residual flexural tensile strengths $f_{R,1}$, $f_{R,2}$ and $f_{R,3}$ and the ratio $f_{R,3}/f_{R,1}$ is no further increased.

Surprisingly, steel fibres with anchorage ends having four straight sections show the best performance.

When the steel fibres of Table 2 are subjected to a pull out test to determine the anchorage force, steel fibre FIB3 (having four straight sections) has the best anchorage in concrete.

As a matter of example, steel fibres according to the invention may be made as follows.

Starting material is a wire rod with a diameter of e.g. 5.5 mm or 6.5 mm and a steel composition having a minimum carbon content of 0.50 percent by weight (wt %), e.g. equal to or more than 0.60 wt %, a manganese content ranging from 0.20 wt % to 0.80 wt %, a silicon content ranging from 0.10 wt % to 0.40 wt %. The sulphur content is maximum 0.04 wt % and the phosphorous content is maximum 0.04 wt %.

A typical steel composition comprises 0.725% carbon, 0.550% manganese, 0.250% silicon, 0.015% sulphur and 0.015% phosphorus. An alternative steel composition comprises 0.825% carbon, 0.520% manganese, 0.230% silicon, 0.008% sulphur and 0.010% phosphorus. The wire rod is cold drawn in a number of drawing steps until its final diameter ranging from 0.20 mm to 1.20 mm.

In order to give the steel fibre its high elongation at fracture and at maximum load, the thus drawn wire may be subjected to a stress-relieving treatment, e.g. by passing the wire through a high-frequency or mid-frequency induction coil of a length that is adapted to the speed of the passing wire. It has been observed that a thermal treatment at a temperature of about 300° C. for a certain period of time results in a reduction of the tensile strength of about 10% without increasing the elongation at fracture and the elongation at maximum load. By slightly increasing the temperature, however, to more than 400° C., a further decrease of the tensile strength is observed and at the same time an increase in the elongation at fracture and an increase in the elongation at maximum load.

The wires may or may not be coated with a corrosion resistant coating such as a zinc or a zinc alloy coating, more particularly a zinc aluminium coating or a zinc aluminium magnesium coating. Prior to drawing or during drawing the wires may also be coated with a copper or copper alloy coating in order to facilitate the drawing operation.

The stress-relieved wires are then cut to the appropriate lengths of the steel fibres and the ends of the steel fibres are given the appropriate anchorage or thickening. Cutting and hook-shaping can also be done in one and the same operation step by means of appropriate rolls.

The thus obtained steel fibres may or may not be glued together according to U.S. Pat. No. 4,284,667.

In addition or alternatively, the obtained steel fibres may be put in a package, as for example a chain package or a belt like package. A chain package is for example disclosed in EP-B1-1383634; a belt like package is disclosed in European patent application with application number 09150267.4 of Applicant.

The invention claimed is:

1. A steel fibre configured to reinforce concrete or mortar, said steel fibre comprising:
    a straight middle portion and an anchorage end at one or both ends of said middle portion,
    said middle portion having a main axis,
    said anchorage end configured to deflect from said main axis of said middle portion in a deflection section, said anchorage end having n bent sections, with n being equal or larger than 2,
    said steel fibre configured in a way such that when said steel fibre is in a stable position on a horizontal surface, said steel fibre defines a vertical projection on said horizontal surface, wherein in said vertical projection on said horizontal surface, the vertical projections of all of said n bent sections of said anchorage end are located at one side of the vertical projection of said main axis.

2. The steel fibre according to claim 1, wherein in said vertical projection on said horizontal surface, the vertical projection of none of said n bent sections is located on the vertical projection of said main axis or on the vertical projection of a line extending from said main axis.

3. The steel fibre according to claim 1, wherein said middle portion of said steel fibre has a tensile strength $R_m$ of at least 1000 MPa.

4. The steel fibre according to claim 1, wherein said middle portion has an elongation at maximum load $A_{g+e}$ of at least 2.5%.

5. The steel fibre according to claim 1, wherein said steel fibre is in a stress-relieved state.

6. The steel fibre according to claim 1, wherein said middle portion of said steel fibre is provided with at least one flattened section.

7. The steel fibre according to claim 1, wherein said middle portion of said steel fibre has a diameter D ranging from 0.1 mm to 1.20 mm.

8. The steel fibre according to claim 1, wherein said steel fibre has a length to diameter ratio L/D ranging from 40 to 100.

9. A concrete structure reinforced with steel fibres according to claim 1.

10. The concrete structure according to claim 9, wherein the ratio residual flexural tensile strength $f_{R,3}$ divided by residual flexural tensile strength $f_{R,i}$ ($f_{R,3} / f_{R,3}$) is higher than 1 with a dosage of said steel fibres of less than 1 vol%.

11. The concrete structure according to claim 9, wherein the residual flexural tensile strength $f_{R,3}$ is higher than 5 or even higher than 6 with a dosage of said steel fibres of less than 1 vol %.

12. A method of using the steel fibre according to claim 1 for a load carrying structure of concrete by placing the steel fibre in the load carrying structure.

* * * * *